US007164110B2

(12) United States Patent
Pitigoi-Aron et al.

(10) Patent No.: US 7,164,110 B2
(45) **Date of Patent: *Jan. 16, 2007**

(54) DIODE-BASED LIGHT SENSORS AND METHODS

(75) Inventors: Radu Pitigoi-Aron, Danville, CA (US); Ulrich Forke, Carlsbed, CA (US); Roar Viala, Capestang (FR)

(73) Assignee: Watt Stopper, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/944,560

(22) Filed: Sep. 16, 2004

(65) Prior Publication Data

US 2005/0047133 A1 Mar. 3, 2005

Related U.S. Application Data

(63) Continuation of application No. 10/431,978, filed on May 7, 2003, now Pat. No. 6,933,486, which is a continuation of application No. 10/045,947, filed on Oct. 26, 2001, now Pat. No. 6,614,013.

(51) Int. Cl.
*G01J 1/32* (2006.01)
*F21V 9/16* (2006.01)

(52) U.S. Cl. .................... 250/205; 250/208.4; 315/150

(58) Field of Classification Search ................ 250/205, 250/214 AB, 214.1, 214 B, 206, 208.4, 214 AL; 315/150, 156, 158; 357/514; 362/84, 191, 362/322, 368
See application file for complete search history.

(56) References Cited

U.S. PATENT DOCUMENTS 3,912,866 A 10/1975 Fox ............................ 179/1 E
3,993,569 A 11/1976 Zinsmeyer et al. ......... 250/209
4,021,679 A 5/1977 Bolle et al. ................. 307/117
4,093,943 A 6/1978 Knight ....................... 340/220
4,107,659 A 8/1978 Massa ........................ 340/552
4,233,545 A 11/1980 Webster et al. ....... 250/214 AL
4,330,706 A * 5/1982 Lawenhaupt .......... 250/214 AL
4,458,170 A 7/1984 Takayama et al. .......... 310/322

(Continued)

OTHER PUBLICATIONS

Vishay, Vishay Telefunken, "Physics of Optoelectronic Devices Light-Emitting Diodes,"Dec. 1999, pp. 1-7.

(Continued)

*Primary Examiner*—Stephone B. Allen
(74) *Attorney, Agent, or Firm*—Haverstock & Owens LLP

(57) ABSTRACT

The present invention provides an illumination management system that includes a first LED that outputs a first signal when exposed to a first spectrum of light, the first signal indicating an intensity of light from the first spectrum; a second LED that outputs a second signal when exposed to a second spectrum of light, the second signal indicating an intensity of light from the second spectrum and wherein the second spectrum includes at least some wavelengths that are not in said first spectrum. In some embodiments, more LEDs could be included in the system for associating the presence of light energy from different parts of the light spectrum. Also included is light control circuitry, coupled to the LEDs, configured to generate a lighting control signal that can be output to one or more lights to adjust the lights to a desired light level, wherein the lighting control signal varies in response to said first and second signals.

18 Claims, 3 Drawing Sheets

U.S. PATENT DOCUMENTS

| | | | | |
|---|---|---|---|---|
| 4,607,186 | A | 8/1986 | Takayama et al. | 310/324 |
| 4,628,496 | A | 12/1986 | Lee | 367/93 |
| 4,695,769 | A | 9/1987 | Schweickardt | 315/158 |
| 4,751,623 | A | 6/1988 | Gaines et al. | 362/276 |
| 4,757,430 | A | 7/1988 | Dubak et al. | 362/100 |
| 4,820,938 | A | 4/1989 | Mix et al. | 307/117 |
| 4,914,859 | A | 4/1990 | Gionet et al. | 49/25 |
| 5,015,994 | A | 5/1991 | Hoberman et al. | 340/567 |
| 5,185,728 | A | 2/1993 | Gilchrist | 367/163 |
| 5,189,393 | A | 2/1993 | Hu | 340/522 |
| 5,251,188 | A | 10/1993 | Parsons et al. | 367/140 |
| 5,307,051 | A | 4/1994 | Sedlmayr | 340/573 |
| 5,386,210 | A | 1/1995 | Lee | 340/567 |
| 5,442,177 | A * | 8/1995 | Boulos et al. | 250/342 |
| 5,489,827 | A | 2/1996 | Xia | 315/294 |
| 5,495,402 | A | 2/1996 | Houssian | 362/226 |
| 5,495,766 | A | 3/1996 | Kota et al. | 73/652 |
| 5,638,824 | A | 6/1997 | Summers | 128/721 |
| 5,640,143 | A | 6/1997 | Myron et al. | 340/541 |
| 5,652,567 | A | 7/1997 | Traxler | 340/552 |
| 5,699,243 | A | 12/1997 | Eckel et al. | 364/140 |
| 5,701,058 | A | 12/1997 | Roth | 315/158 |
| 5,713,655 | A | 2/1998 | Blackman | 362/95 |
| D393,912 | S | 4/1998 | Yuen | D26/26 |
| 5,763,872 | A * | 6/1998 | Ness | 250/214 AL |
| 5,867,099 | A | 2/1999 | Keeter | 340/567 |
| D409,317 | S | 5/1999 | Yuen | D26/26 |
| 5,932,861 | A | 8/1999 | Iwaguchi et al. | 235/455 |
| 5,946,209 | A | 8/1999 | Eckel et al. | 364/143 |
| 5,962,989 | A | 10/1999 | Baker | 315/294 |
| 5,984,513 | A | 11/1999 | Baldwin | 364/528.21 |
| 6,051,787 | A | 4/2000 | Rintz | 174/66 |
| D425,222 | S | 5/2000 | Yuen | D26/26 |
| D425,638 | S | 5/2000 | Yuen | D26/26 |
| 6,084,231 | A | 7/2000 | Popat | 250/214 AL |
| 6,087,588 | A | 7/2000 | Soules | 174/66 |
| 6,087,760 | A | 7/2000 | Yamaguchi et al. | 310/334 |
| 6,121,875 | A | 9/2000 | Hamm et al. | 340/540 |
| D431,660 | S | 10/2000 | Yuen | D26/26 |
| 6,132,057 | A | 10/2000 | Williams | 362/100 |
| 6,151,529 | A | 11/2000 | Batko | 700/28 |
| 6,172,301 | B1 | 1/2001 | Goodsell | 174/66 |
| RE37,135 | E | 4/2001 | Elwell | 315/154 |
| 6,337,541 | B1 | 1/2002 | Dickie et al. | 315/169.3 |
| 6,343,134 | B1 | 1/2002 | Czerwinski | 381/342 |
| 6,390,647 | B1 | 5/2002 | Shaefer | 362/276 |
| 6,466,826 | B1 | 10/2002 | Nishihira et al. | 700/17 |
| 6,566,882 | B1 | 5/2003 | Baldwin et al. | 324/418 |
| 6,583,573 | B1 | 6/2003 | Bierman | 315/149 |
| 6,614,013 | B1 * | 9/2003 | Pitigoi-Aron et al. | 250/205 |
| 6,693,527 | B1 | 2/2004 | Bone | 340/500 |
| 6,894,609 | B1 | 5/2005 | Menard et al. | 340/531 |
| 2002/0060283 | A1 * | 5/2002 | Jordan et al. | 250/205 |
| 2002/0134909 | A1 | 9/2002 | Shiota et al. | 250/205 |
| 2005/0128751 | A1 | 6/2005 | Roberge et al. | 362/276 |

OTHER PUBLICATIONS

Vishay, Vishay Telefunken, "Measuring Technique," Dec. 1999, pp. 1-9.

Asian Technology Information Program (ATIP), "Blue LED's: Breakthroughs and Implications," ATIP Report ATIP95.59, Aug. 27, 1995, See www.cs.arizona.edu/japan/atip/public/atip.reports.95/atip96.59r.html.

Energy User News, "The Coming Revolution in Lighting Practice," by Sam Berman, Oct. 2000, pp. 24-26.

IESNA Paper #59, "Characterizing Daylight Photosensor System Performance to Help Overcome Market Barriers," by Andrew Bierman et al.

Journal of the Illuminating Engineering Society, "Improving the Performance of Photo-Electrically Controlled Lighting Systems," by Francis Rubinstein et al., Winter 1989, pp. 70-94.

Specifier Reports, "Photosensors- Lightsensing devices that control output form electric lighting systems", National Light Product Information Program, vol. 6 No. 1, Mar. 1998, p. 1 of 20.

"Si Photodiode—S7686", Hamamatsu, pp. 1.

"Si Photodiodes—S6626, S6838", Hamamatsu, pp. 1-2.

"Si Photodiodes—S7160, S7160-01", Hamamatsu, pp. 1-2.

* cited by examiner

DIODE-BASED LIGHT SENSORS AND METHODS

CROSS-REFERENCES TO RELATED APPLICATIONS

This Application is a continuation application of the U.S. patent application Ser. No. 10/431,978, titled "ILLUMINATION MANAGEMENT SYSTEM", filed May 7, 2003 now U.S. Pat. No. 6,933,486, which is a continuation of U.S. patent application Ser. No. 10/045,947, titled "ILLUMINATION MANAGEMENT SYSTEM INCLUDING LEDS FOR DETECTING EXPOSURE TO RADIATION", filed on Oct. 26, 2001, now U.S. Pat. No. 6,614,013 which claims priority from U.S. patent application Ser. No. 09/871,312, titled "LIGHTING CONTROL CIRCUIT", filed May 30, 2001, now U.S. Pat. No. 6,617,560. The U.S. patent application Ser. No. 10/431,978, titled "ILLUMINATION MANAGEMENT SYSTEM", filed May 7, 2003 and the U.S. Pat. Nos. 6,614,013 and 6,617,560 are all hereby incorporated by reference.

BACKGROUND OF THE INVENTION

The present invention relates generally to controlling the output of lights. More particularly, embodiments of the invention relate to a method and apparatus that use LEDs as light sensors for detecting light levels in an area or room and for controlling these light levels.

Lighting control circuits are used with electronic dimming ballasts. These ballasts control the output of lights, such as fluorescent lights, that illuminate areas such as rooms, offices, patios, etc.

Traditionally, photocells and photodiodes are used as photo-transducers or light sensors for lighting control systems. A photocell is a device that detects light in a controlled area or room. It then uses information from the light, e.g., illumination level, to adjust light output in the controlled area.

Photocells and photodiodes are wide spectrum sensors and they respond to a spectrum much wider than the spectrum perceived by the human eye. This is acceptable for a variety of lighting control systems including systems operating in areas were the controlled light has the same spectrum all times, e.g., where only fluorescent lights are delivering the illumination. If the spectrum distribution remains the same, the resultant electrical energy is proportional to visible energy or light. Hence, a lighting control system can be adjusted to keep the visible light level constant.

Typically, the light in a controlled area or room has two or more different contributing light sources, e.g., artificial light plus sunlight. For example, the controlled light source could be fluorescent lighting and the variable or "disturbing" source could be the sun, i.e., daylight. Note that for the purposes of discussion, the terms sunlight, daylight and natural light are used synonymously. Similarly, the terms electrically produced light and artificial light are used synonymously. Artificial light would include for example fluorescent light, incandescent light, HID, etc.

Different light sources could have different energy spectrums. For example, radiometric energy spectrum of sunlight is wider than that of electronically produced light such as fluorescent light. Similarly, the energy spectrum of a fluorescent light is different from that of an incandescent light. Also, the human eye perceives only a part of the energy spectrum emitted by all available light sources, e.g., sun light, incandescent light, fluorescent light, etc. Research done on a variety of human subjects shows that the sensitivity of the human eye varies with the lighting level. It is widely accepted by specialists in the field that under daylight conditions the spectral response of the human eye can be approximated by the so-called "photopic curve." This has a well-known bell shape and ranges from about 460 nm to 680 nm wavelengths, with the peak in the region of 560 nm.

Some research has shown that under poor illumination conditions the human eye changes its spectral sensitivity. Also, low illumination affects different people differently. A new characteristic has been devised for this behavior. It is called the "scotopic curve." This is centered at about 410 nm and covers the spectrum from about 380 nm to 450 nm. In analyzing its overall behavior, it is perhaps appropriate to say loosely that the human eye can perceive light in the range of 400 nm to 700 nm.

A problem arises because most conventional photo-transducers capture or detect the entire energy spectrum produced by all light sources. Thus, when the photo-transducer transforms the captured light energy into a current, it does not distinguish between different wavelengths of light, i.e., sunlight and artificial light. This conventional design of lighting control systems is based on the assumption that the current represents visible light. Unfortunately, this is a poor assumption. In one known light controller circuit, for example, a current resulting from both natural and artificial light components is interpreted by a subsequent circuit as though it is a current merely resulting from the artificial light contribution. Accordingly, the system dims the artificial lights until the resultant voltage equals a set point or preset illumination level. This is problematic because the resultant voltage is derived from both natural and artificial light components which include non-visible energy, while the preset, illumination level is set according to visible light standards, e.g., 40 foot candles. Consequently, this could result in full dimming of the artificial lights when the incoming daylight provides insufficient illumination for a typical room.

Some circuits use a light filter to allow only the visible spectrum to reach the photo-transducer. For example, an optical filter placed over a photo-transducer can achieve this. This would mimic the photopic curve or visible spectrum. Light sensors using optical filters are more efficient than conventional photocells used without such filters. Optical filters, however, are expensive. These special pickup heads are typically used in some professional applications. Note that the term optical sensor, as used herein, is used to mean a photo-transducer used with an optical filter.

Thus, it is desirable to have an alternative illumination management system that can detect a spectrum of light close to that which the human eye detects.

SUMMARY OF THE INVENTION

Embodiments of the present invention achieve the above needs with a new illumination management system. More particularly, some embodiments of the invention provide an illumination management system that includes a first LED that outputs a first signal when exposed to a first spectrum of light. The first signal indicates an intensity of light from a first spectrum. Also included is a second LED that outputs a second signal when exposed to a second spectrum of light. The second signal indicates an intensity of light from the second spectrum. The second spectrum includes at least some wavelengths that are not ill the first spectrum. Also included is a light control circuitry, coupled to the first and second LEDs, and configured to generate a lighting control signal that can be output to one or more lights to adjust the lights to a desired light level.

In one embodiment, the illumination management system includes a detection circuit that is coupled to the plurality of LEDs. The detection circuit is configured to generate a second signal from each first signal. Also included is an identification circuit that is coupled to the detection circuit and associates the actual light composition. The actual light composition is a combination of light values derived from each of the first signals. Each light value describing the light source and light intensity of the light source. Also included is a correction circuit that is coupled to the identification circuit and compares the actual light composition to a desired light composition. Also included is a driver circuit that is grouped to the correction factor circuit and configured to generate a third signal to control and illumination level of one or more lights. The third signal is derived from the difference between the actual light composition and the desired light composition. The third signal is varied in response to the difference.

In another embodiment, the illumination management system adjusts the ambient light in response to changes in the ambient light. In another embodiment a light spectrum detected by at least one of the LEDs substantially mimics the photopic curve. In another embodiment, the illumination management system includes at least one of a red LED, a green LED, a blue LED, and an IR LED.

Embodiments of the present invention achieve their purposes in the context of known circuit technology and known techniques in the electronic arts. Further understanding, however, of the nature, objects, features, aspects and embodiments of the present invention is realized by reference to the latter portions of the specification, accompanying drawings, and appended claims. Other objects, features, aspects and embodiments of the present invention will become apparent up on consideration of the following detailed description, accompanying drawings, and appended claims.

DESCRIPTION OF THE SPECIFIC EMBODIMENTS

Figure 1:
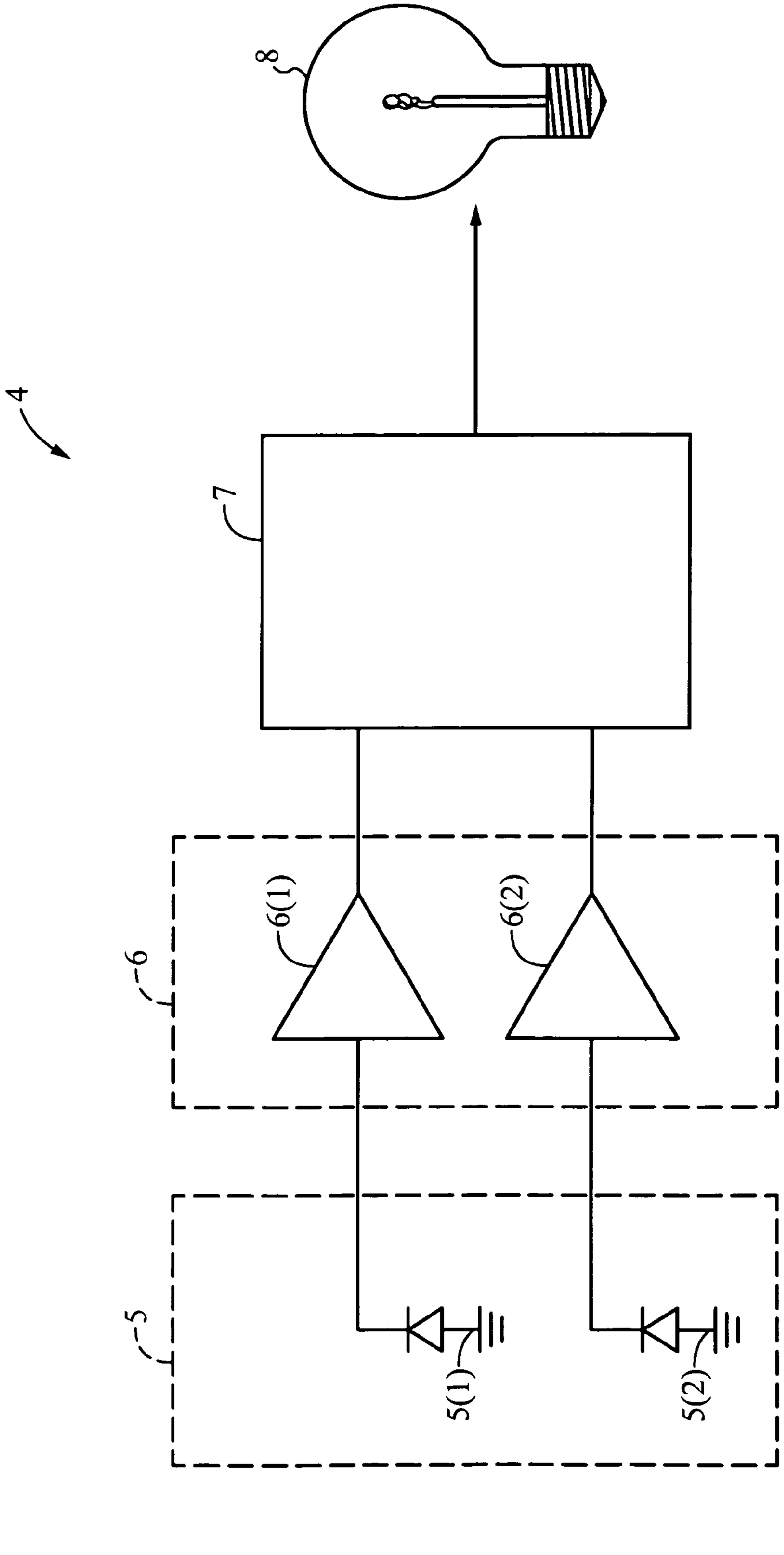
FIG. 1 shows a simplified high-level block diagram of an illumination management system, according to an embodiment of the present invention.

FIG. 1 shows a simplified high-level block diagram of an illumination management system 4, according to an embodiment of the present invention. Included is a pick-up stage 5, which includes LEDs 5(1) and 5(2). LEDs 5(1) and 5(2) function as pick-up elements for the spectral region of the light in which each of the LEDs would emit light. When LEDs 5(1) and 5(2) are exposed to light, each outputs a signal indicating an intensity of light from its corresponding spectrum. In some embodiments, each LEDs detects light from a unique spectrum. In other embodiments, the spectrums detected by the LEDs can overlap, at least in part. The use of LEDs as light detectors is described in more detail below (description of FIG. 2).

An amplifier stage 6, which includes amplifiers 6(1) and 6(1), receives, amplifies, and outputs the signals received from pick-up stage 5. A control stage 7 receives amplified signals from amplifier stage 6 and generates a lighting control signal that can be output to one or more controlled lights 8 to adjust the lights to a desired light level. The lighting control signal varies in response to the signals generated by pick-up stage 5. While the embodiment of FIG. 1 is described with two LEDs and two amplifiers, the actual number of LEDs and amplifiers used will depend on the specific application.

Figure 2:
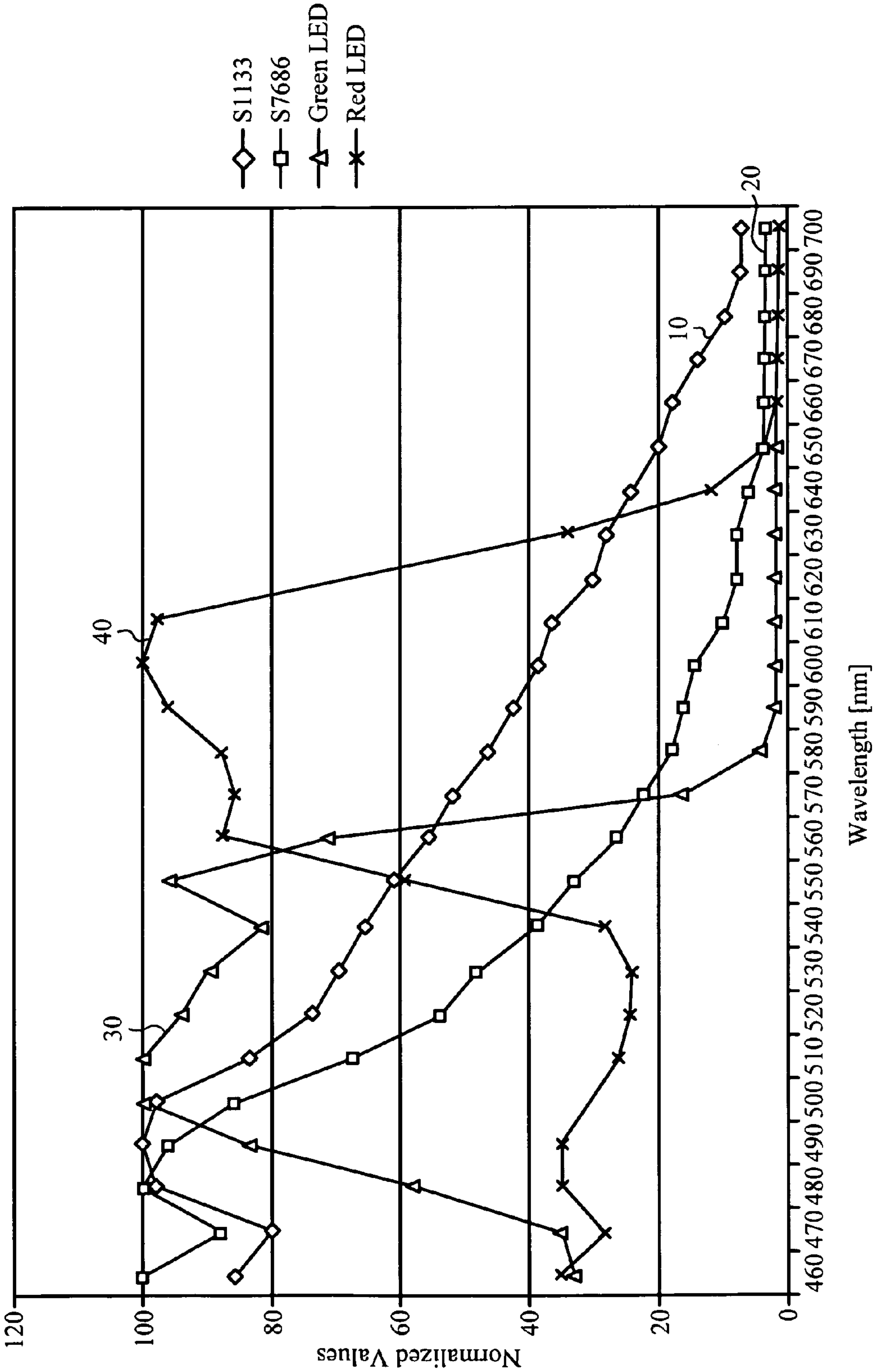
FIG. 2 shows a graph including aradiometic spectrum for two types of optical sensors and two types of LEDs.

FIG. 2 shows a graph including radiometric spectrum for two types of optical sensors and two types of LEDs. The human eye perceives light approximately in the range of 400 nm to 700 nm, or the photopic curve. An optical sensor can be used to capture only the spectrum of light seen by the human eye, under normal illumination. An optical sensor 10 can capture light having wavelengths of 460 to 670 nm. Similarly, an optical sensor 20 can capture light having wavelengths of 460 to 600 nm. The photopic curve ranges from about 460 nm to 680 nm wavelengths. Thus, an optical sensor can capture the photopic curve. The photopic curve is also referred to as the "photopic luminosity curve." One standard for the photopic curve has been established by C.I.E., a European standardization committee. This curve is referred to as the "C.I.E. relative photopic luminosity curve."

LEDs are nominally used to emit light. The light emitted from an LED has wavelengths that fall within a certain range depending on the type of LED. For example, a green LED emits light having wavelengths ranging from 470 nm to 570 nm, and a red LED emits light having wavelengths ranging from 540 nm to 630 nm.

While LEDs are known to emit light, it is possible for them to detect light. The captured spectrum of the LED is very close to its emitted spectrum. This spectrum is fairly narrow and the LED can be manufactured to cover a known band. For example, a green LED 30 captures light having wavelengths ranging from 470 nm to 570 nm, and red LED 40 captures light having wavelengths ranging from 540 nm to 630 nm. Accordingly, green and red LEDs can capture a substantial portion of the photopic curve. Because LEDs are inexpensive and already mass-manufactured, a low cost and yet very useful light spectrum determination can be achieved.

Figure 3:
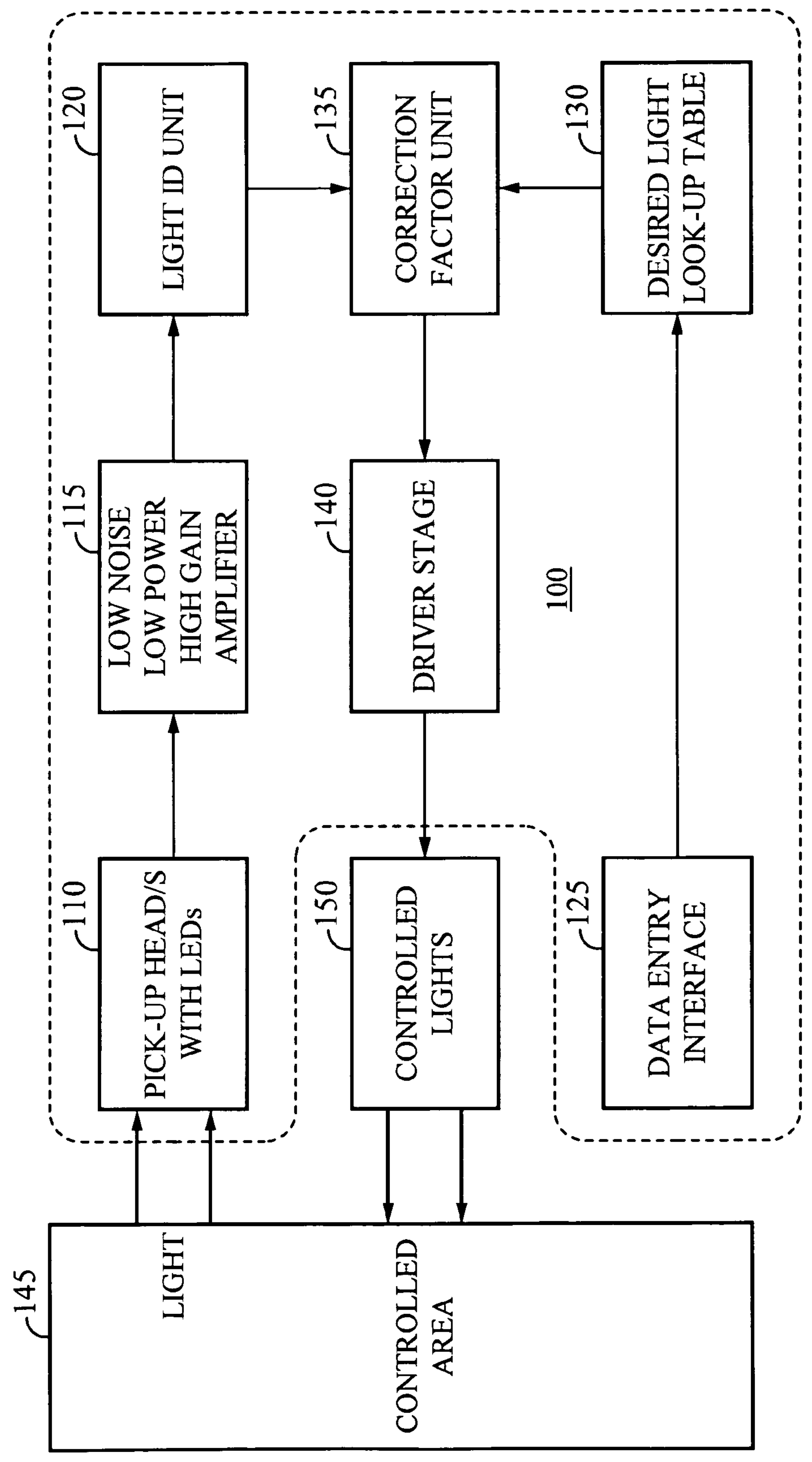
FIG. 3 shows a simplified high-level block diagram of an illumination management system, according to another embodiment of the present invention.

FIG. 3 shows a simplified high-level block diagram of an illumination management system 100 that includes a detection circuit 110, an amplifier circuit 115, a light identification circuit 120, a data entry interface 125, a look-up table 130, a correction circuit 135, and a driver circuit 140, according to another embodiment of the present invention. Detection circuit 110 (labeled "pick-up head") includes light emitting diodes (not shown).

The number of LEDs in detection circuit 110 and the parameters of each LED will depend on the specific application. A variety of LEDs, e.g., red, green, blue, infrared, etc., are available and they are strategically chosen such that each delivers pertinent information used to associate the quality and source of the detected light. For example, as described above, red and green LEDs detect light having wavelengths close to photopic curve. Blue and infrared (IR) LEDs detect sunlight. While an IR LED is most useful in detecting sunlight, windows can filter IR radiation thus somewhat limiting what an. IR LED detects. A blue LED, however, would still detect portions of the sunlight thus providing adequate information for certain applications as to the amount of sunlight in a given area. Blue LEDs can also detect fluorescent lighting. It can be seen that the light spectrums captured by different LEDs are associated with different light sources.

The most useful combination of LEDs will depend on the specific application. In various embodiments, the combination is based on the light, i.e., light components, that have to be associated in a controlled area. For example, in one embodiment, there can be an arrangement of three LEDs. One combination can include a red LED, a green LED, and a blue LED to capture light radiation falling approximately within the photopic curve as well as the curves for sunlight and fluorescent lighting. In another embodiment, there can be an arrangement of four LEDs, the combination including an IR, a red, a green and a blue, for example. More or fewer LEDs can be used depending on the specific application. Other LEDs can also be used to detect light within other spectrums. By using more LEDs, the precision of spectrum determination can be controlled, e.g., widened, narrowed, shifted, etc. The illumination management system can be configured to calibrate at least one of the LED's characteristics to correct for variations from the manufacturing process.

The LEDs detect the light level in a room through a lens (not shown). In one embodiment, the lens is set such that the field of view is 60 degrees. The lens can be moved closer to or further from an LED to increase or decrease the LED's field of view.

A controlled area 145 includes light fixtures that are controlled by illumination management system 100. The light fixtures illuminate controlled area 145. In some embodiments, users within controlled area 145 can access illumination management system 100 and can program it to maintain a desired light level in controlled area 145. Illumination management system 100 can have multiple "pick-up heads" 100. Each pick-up head call be in a different controlled area. If there is more than one controlled area, the controlled areas can be contiguous but need not be. A panel 150 (also labeled "controlled lights") can be used to indicate whether a particular fixture is under the system's control.

Amplifier circuit 115 (labeled "low-noise low-power high-gain amplifier") increases the operating current of the LEDs. The pickup efficiency of each LED is increased to usable levels comparable to those of other commonly used sensors such as conventional wide spectrum sensors. The Amplifier circuit may include a gain control or an implicit range detector to better characterize incoming signals, an analogue multiplexer for cost savings, or a communication interface for communication to light identification circuit 120.

Light identification (ID) circuit 120 processes incoming information and provides ID numbers for different types of detected light, e.g., sunlight, fluorescent light, etc. ID numbers can be associated with particular light sources and amount of energy detected from these light sources. The ID numbers can be stored in a memory (not shown) such as RAM memory. This information can be expressed in a digital format or analog format or combination of both depending on the specific application. For example, if expressed in a digital format, an ID number can be a series of digits representing the amount of energy detected by detection circuit 110. In some embodiments, detection circuit 110 can include an analogue-to-digital (A/D) converter. Light ID circuit 120 can be managed by a processor (not shown). An A/D converter can be implemented by using an A/D portion of a processor.

Data entry interface 125 provides an end user with access to illumination management system 100. Accordingly, an end user (also referred to as a "user" or an "illumination manager") can program a desired light level. Desired light levels can be defined for a various times and particular conditions throughout the day, for various controlled areas. The term "particular conditions" can be understood to be the particular content of the light within the controlled area at a given moment. For example, suppose the illumination management system uses red, green, and IR LEDs. On a given day just before dawn, there would be no infrared radiation detected due to the absence of sunlight. There would be radiation from artificial lights. Accordingly, only the red and green LED would detect light. The system would thus flow that only artificial light fills the room. At dawn the sun would begin to contribute infrared radiation which would be detected by an IR LED. This information would then be known to the illumination management system. During a cloudy day, an IR LED would pick up less light than during a sunny day. Illumination management system 100 could at a given moment, estimate with fair accuracy the composition of light, which would include the different types of light sources contributing to the total light in a given area. In addition to associating the types of light sources, illumination management system 100 can also ascertain how much light each light source is contributing at a given moment. How much light can be estimated by the relative strength of the signals produced by the LEDs. For example, as the sun rises after dawn, the strength of the signal produced by an IR LED would increase with time. Even though the strength of a green LED would also increase due to an increase in sunlight. A mathematical algorithm (not shown) can be used to ascertain the contributions from artificial lights and from natural sunlight.

The signals from the LEDs could then be translated into an ID number indicating the amount of light detected by each LED. An illumination manager (IM) can indicate that the light level at a given moment is the desired light level under particular conditions. Some embodiments for interfacing with the illumination management system can include, for example, an LCD display showing a scroll-down menu. Other embodiments can include a two-button interface to reduce manufacturing costs. Yet other embodiments can involve an intelligent or programmed controller that provides desired light levels.

In a specific embodiment, to manually set a desired light level, an IM accesses the system by using a password or protocol. The IM then switches the system from "auto" mode to "manual" mode and then modifies the light in the controlled area until it reaches a desired light level. The IM then programs that desired light level into the system. That light level will be associated with the particular conditions at the moment. The IM then switches the system back to "auto" mode. Look-up table 130 (labeled "desired light look-up table) stores the ID numbers associated with various desired light levels.

Correction circuit 135 evaluates the difference between the actual measured light level and the desired light level. Collection circuit 135 is labeled "correction factor unit." The processing employs a multiple-dimension interpolation algorithmic that is specifically designed for illumination management system 100. Interpolation techniques are well known in the art. In one embodiment, the algorithm generates a correction signal derived from the difference between the actual measured light level and a desired light level. The correction signal is used to control light fixtures via driver circuit 140. The illumination management system continuously adapts to achieve the desired light level in response to changes in the illumination conditions throughout the day.

In another embodiment, the desired light level is a function of one or more ID numbers. The ID numbers can be provided where each ID number represents the light level at various times during a 24-hour period, e.g., 9 a.m., 12 p.m., 3 p.m., 6 p.m., etc. An algorithm can compare the actual measured light level to the desired light level. Based on the difference, if any, the algorithm generates a collection signal that is used to adjust the controlled lighting to bring the actual measured light closer to the desired light level.

The exact number of ID numbers and their associated light levels will depend on the specific application. There can be more than one group of ID numbers where each group is associated with a different controlled area. In some embodiments, the ID numbers can be established manually by an illumination manager. For a given controlled area, the manager can establish each ID number by adjusting the lighting at various times during the day or night to desired levels and programming an ID number for each desired level. As such, each ID number would be associated with a particular light level at a particular time of day. In other embodiments, one or more groups of ID numbers can be generated automatically by a microprocessor.

In some embodiments, where the desired light level is a function of more than one ID number, the algorithm call derive the desired light level by interpolating between the ID numbers. The particular ID numbers used in the function will depend on the specific application. In one specific embodiment, for example, a derived desired light level can be interpolated from two ID numbers associated with the desired light levels at 12 p.m. and 3 p.m., where the derived desired light level represents the desire light level at 1:30 p.m.

In another specific embodiment, two groups of ID numbers can be established for the same controlled area, where, for example, each group is established by a different illumination manager. As such, the algorithm can derive a desired light level by interpolating between two ID numbers associated with the same time, if the two ID numbers are different. In some embodiments, ID numbers to be interpolated could be weighted according to a priority scheme.

The embodiments described herein are beneficial because such embodiments operate in two rather different lighting conditions—during the night and during the day. By associating detected light with particular light sources, e.g., natural and artificial light, embodiments of the invention can accommodate for variations in daytime illumination. For example, sunlight could vary substantially throughout a given day due to clouds, window blinds, etc. Also, embodiments of the invention can also accommodate for variations in night time illumination, e.g., due to aging of fluorescent lights, ambient moon light, or lighting from adjacent rooms or hallways. For example, the illumination output from a fluorescent light might decrease about 10% or less during its lifetime. Desired illumination levels can be programmed for lighting adjustments around the clock, both day and night.

Driver circuit 140 (labeled "driver stage") controls the light fixtures in a controlled area. Driver circuit 140 functions as a digital-to-analog (D/A) converter and sends appropriates signals to control light fixtures in a controlled area, ultimately establishing a desired light level.

Embodiments of the illumination management system can be networked to different locations providing multiple and separate controlled areas. Thus, different controlled areas can each have detection circuits that provide information to the illumination management system. These different controlled areas can be monitored and controlled independently. Other embodiments can include motion sensors to supplement the detection circuits.

The lighting control circuits of FIGS. 1 and 3 operate in a closed-loop environment. That is, the circuit takes the information related to the existing illumination level in a controlled area, such as in a particular room or office, and then compares the information to a preset value, or desired illumination level. The light sensor (LED) is placed in the saute environment as the user. The circuit then varies the output of the controlled light sources to match the actual illumination level to the preset value. The main advantage of this approach is that the system adjusts the lighting outcome based on the amount of illumination that it receives from the controlled area. Being designed with a closed-loop, embodiments of the present invention can customize the light to a particular room and accurately control lighting in offices, skylight areas, cafeterias, warehouses and any other area with natural light access.

The closed-loop circuit of FIGS. 1 and 3 includes two paths: an opto-electric path and an electronic path. The opto-electric path travels from the light source controlled by the ballast to the light sensor via the light medium. Stated differently, the opto-electric path includes an electrical interpretation of light intensity or illumination. The electronic path travels from the light sensor to the light source via the illumination management system.

The lighting control circuit of the present invention and its various implementations can be applied in a multitude of ways. Possible applications include but are not limited to energy savings. Embodiments of the present invention can have a number of applications. In one example, as described above, the lighting control circuit can be used for illumination management where the visible spectrum is the main target.

Embodiments of the invention can customize the system to particular controlled areas. Specifically, embodiments can account for the reflective characteristics of a controlled area. For example, a room with a bright color scheme or with white papers laying on a desktop would be more reflective. Accordingly, a user can adjust the illumination management system to lower the gain while maintaining the desired illumination. Conversely, a user can increase the gain to account for a room that is less reflective, e.g., a room with a dark color scheme. Moreover, the system can be adjusted when room is redesigned (new carpet, new lights, etc.).

While the invention has been described above with respect to an illumination management system, it can also be applied to other technologies, such as light intensity meters incorporating the spectrum analysis capability, e.g., photopic light meters, LUX meters, spectrometers, spectrum analyzers, etc.

Multiple LEDs of various combinations can be used to expand the range of detected radiation. As illustrated, an arrangement of red, blue, and green LEDs can expand the range of detected radiation to match that of visible light with fair accuracy.

With regard to specific embodiments applied to LUX meters, the LED in combination with the illumination management system is configured to emulate a true illuminance sensor and to respond to the photopic curve with sufficient accuracy. Of course, the precise photopic luminosity curve that the LEDs emulates will depend on the specific application. In this particular embodiment, light is measured in lux units. In other embodiments, light can be measured in foot-candle units. The lighting control circuit provides true foot-candle and lux readings with sufficient accuracy. The exact accuracy of emulation will depend on the specific application. For example, the lighting control circuit can be calibrated to differ no more than 10% from the true photopic curve. Moreover, the lighting control circuit can be calibrated to differ no more than 10% from a user's specifications. Such accuracy can provide a veiny reliable meter. Photopic light meters such as a hand held LUX meter could be useful to photographers.

Another application involves associating a particular light source, e.g., sunlight versus artificial light, etc. Different sources of light could each have its own ID that is known to the system. When detected, the system can take certain actions such as signaling the presence of particular light, closing or opening obstructing elements, shutting down power sources, and so on. This can be useful in a variety of areas such as offices, photography studios, showrooms, etc.

Yet, another application involves the conservation of energy. When the control of lights is customized to the human eye, an illumination management system can reduce the power consumption of a lighting system while providing adequate lighting for the users.

CONCLUSION

In conclusion, it can be seen that embodiments of the present invention provide numerous advantages and elegant techniques for controlling lighting. Principally, it detects a spectrum of light close to that which the human eye detects. It uses LEDs, which are widely available, thus simplifying procurement and reducing manufacturing costs. It also eliminates problems associated with conventional wide spectrum photodetectors while eliminating the costs associated with expensive optical filters.

Specific embodiments of the present invention are presented above for purposes of illustration and description. The full description will enable others skilled in the art to best utilize and practice the invention in various embodiments and with various modifications suited to particular uses. After reading and understanding the present disclosure, many modifications, variations, alternatives, and equivalents will be apparent to a person skilled in the art and are intended to be within the scope of this invention. Moreover, the described circuits and method can be implemented in a multitude of different fonts such as software, hardware, or a combination of both in a variety of systems. Moreover, the circuits described can be purely analog or a combination of the both analog and digital. Moreover, the circuits described can be linked to other circuits in a network. Therefore, it is not intended to be exhaustive or to limit the invention to the specific embodiments described, but is intended to be accorded the widest scope consistent with the principles and novel features disclosed herein, and as defined by the following claims.

What is claimed is:

1. A device comprising:

a) a detection means comprising:

i) a first diode configured to measure visible light within a first spectrum; and ii) a second diode configured to measure visible light within a second spectrum, wherein at least a portion of the first spectrum is different from the second spectrum; and b) means for controlling an output of a controlled light source based on a combination of the measured light within the first spectrum and the measured light within the second spectrum.

2. The device of claim 1, wherein the means for controlling the output of the controlled light source comprises an adjustable gain amplifier.

3. The device of claim 1, wherein the means for controlling the output of the controlled light source comprises an identification circuit for identifying types of light in at least one of the first spectrum and the second spectrum and for assigning values to the types of light.

4. The device of claim 1, wherein the means for controlling the output of the controlled light source comprises a correction circuit for evaluating a difference between a composition of light and a target level of light.

5. The device of claim 1, wherein the means for controlling the output of the controlled light source comprises a driver circuit for controlling an applied voltage to the controlled light source.

6. The device of claim 1, wherein the means for controlling the output of the controlled light source comprises a program for instructing the device to maintain a target level of light.

7. The device of claim 1, wherein the means for controlling the output of the controlled light source comprises a data entry interface for selecting a target level of light.

8. The device of claim 1, wherein the means for controlling the output of the controlled light source comprises a processor.

9. The device of claim 1, wherein at least one of the first diode and the second diode is configured to measure sunlight.

10. An illumination management system for controlling light levels comprising:

a) diodes, wherein at least one of the diodes is configured to receive fluorescent light and at least one of the diodes is configured to receive sunlight and generate output signals indicating a level of fluorescent light and a level of sunlight; and b) a lighting control circuit configured to receive the output signals, compare the output signals from the fluorescent light and the output signals from the sunlight and to generate control signals to adjust lights to maintain a combination of the flourescent light and the sun light within a selected range.

11. The system of claim 10, further comprising a data entry interface for inputting the selected range.

12. The system of claim 10, further comprising means for storing measured light levels, comparing a difference between the level of fluorescent light and the level of sunlight and generating the control signals based on the difference.

13. The system of claim 10, further comprising an adjustable gain amplifier for adjusting the selected range.

14. A method of controlling light in a control area, the method comprising:

a) measuring light outputs from a plurality of visible light sources with a light controller using a plurality of diode sensors for measuring two or more different spectra from the plurality of visible light sources; and b) adjusting at least one of the plurality of light sources such that a combination of measured light from the light outputs is maintained within a range.

15. The method of claim 14, wherein the light controller comprises a processor for processing signals generated by the diode sensors and automatically adjusting the at least one of the visible light sources.

16. The method of claim 14, wherein the range is automatically selected using a computer program.

17. The method of claim 14, wherein the range is selected through a user interface.

18. A method of making a light controller comprising electrically coupling two or more diodes to an amplifier for generating light output data from two or more spectra of visible light and electrically coupling the amplifier to a processor that is configured to control lights based on the light output data, wherein the light output data represents a combination of visible light values measured from the two or more spectra of light using the two or more diodes.

* * * * *

UNITED STATES PATENT AND TRADEMARK OFFICE

CERTIFICATE OF CORRECTION

PATENT NO. : 7,164,110 B2
APPLICATION NO. : 10/944560
DATED : January 16, 2007
INVENTOR(S) : Radu Pitigoi-Aron, Ulrich Forke and Roar Viala It is certified that error appears in the above-identified patent and that said Letters Patent is hereby corrected as shown below:

In Column 8, Line 10, please replace “saute” with --same.--.

On Title Page, Item (75)

<u>In the Inventors</u>

For Ulrich Forke, please replace “Carlsbed, CA” with --Vista, CA.--

Signed and Sealed this

Tenth Day of April, 2007

JON W. DUDAS

*Director of the United States Patent and Trademark Office*